Dec. 12, 1967  N. J. HAYES  3,357,122
TWO-COMPONENT ANIMAL TAG
Filed Oct. 23, 1965  2 Sheets-Sheet 1
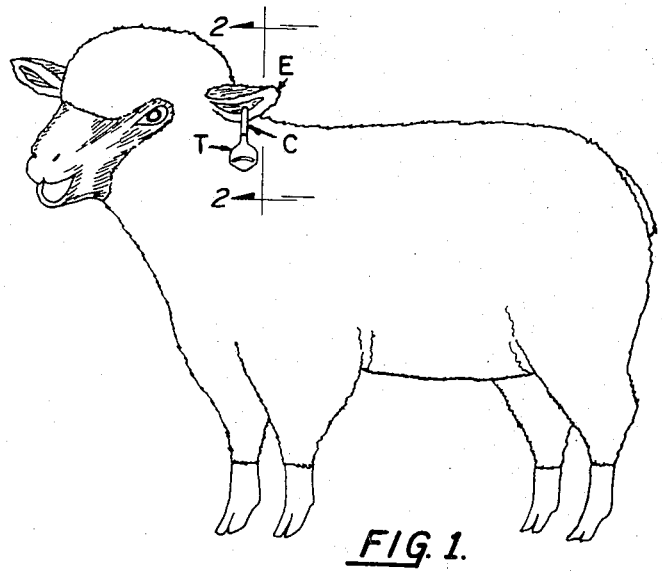
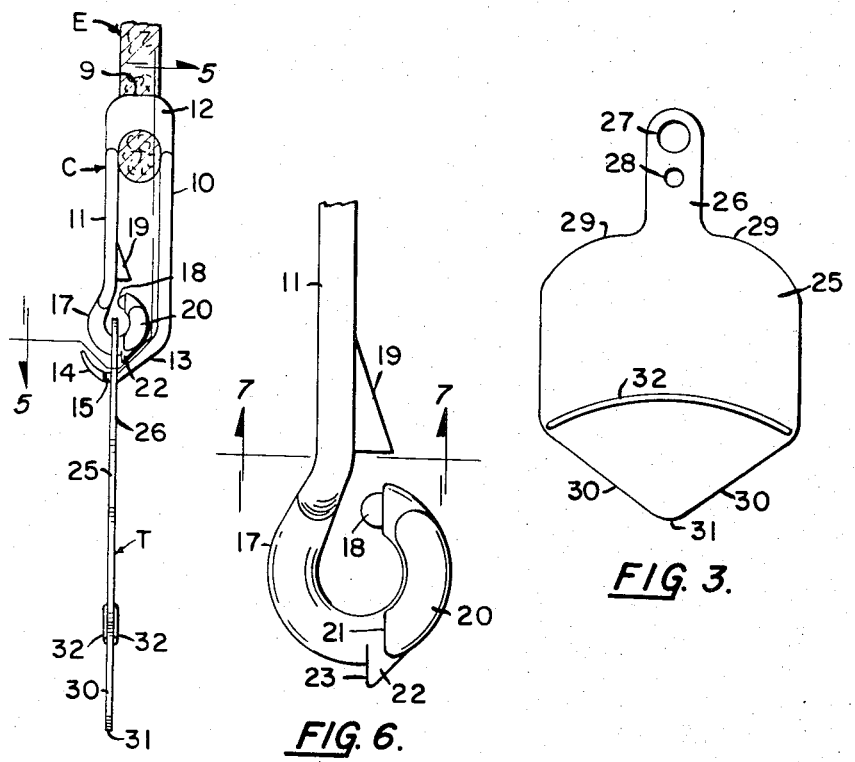
INVENTOR.
NORMAN J. HAYES
BY
Van Valkenburgh & Lowe
ATTORNEYS

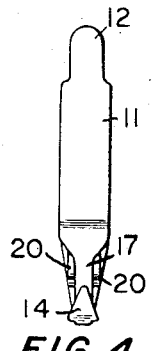
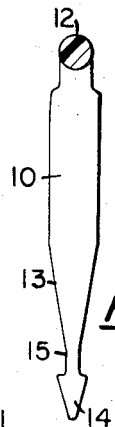
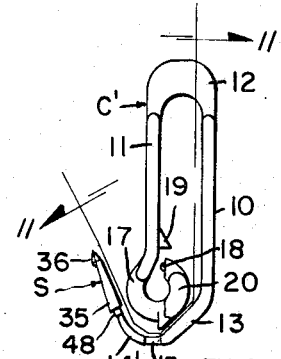
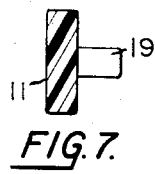
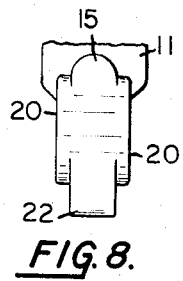
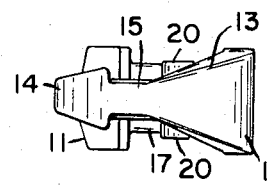
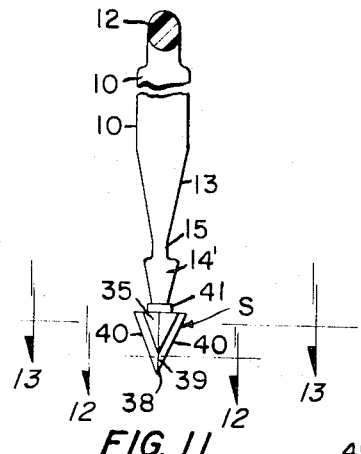
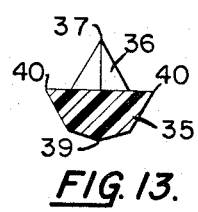
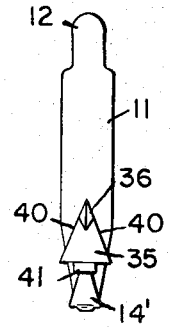
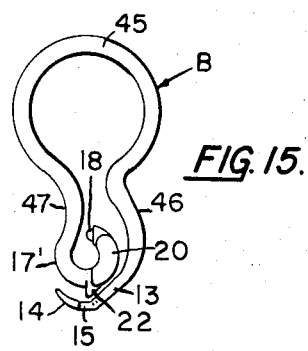

United States Patent Office 3,357,122
Patented Dec. 12, 1967

3,357,122
TWO-COMPONENT ANIMAL TAG
Norman J. Hayes, Cody, Wyo., assignor to Perma Manufacturing Co., Cody, Wyo., a corporation
Filed Oct. 23, 1965, Ser. No. 503,034
11 Claims. (Cl. 40—301)

This invention relates to livestock identification tags, and more particularly to ear tags.

A primary object of the invention is to provide a novel and improved construction of a livestock ear tag consisting of two components, a connector which is attached to an animal's ear and a tag body which is attached to the connector. As such, the invention will be hereinafter referred to as a two-component ear tag, and sometimes simply as an ear tag. It has been found to be especially useful in the marking and identification of sheep and calves and will be described in connection with this use, but it is to be understood that such use is exemplary and in no way restrictive.

Livestock tags are utilized to identify specific animals in a herd or flock in order to maintain records for breeding purposes, milk records, feeding plans, wool production and the like. In the case of sheep, it is desirable to provide an ear tag which may hang below the ear of an animal a distance sufficient to prevent its being obscured by wool. Also, the tag should be easily visible from the front and rear directions. Such an ear tag must be constructed of a tough, pliable, weather-proof material which will not be easily snagged or damaged by encounters with brush or the like, as when the animal is feeding.

In the handling of sheep, it is often desirable to be able to quickly identify different classes of sheep, such as those which will be kept for breeding purposes from those destined for the slaughter house and mothering up lambs. Sometimes the members of a flock cannot be easily sorted out, especially before they are sheared. Moreover, it is necessary to change identification tags as the age and status of an animal changes, and this particular need has not heretofore been satisfactorily met without actually removing tags in the animal's ear, as by cutting them away and repeating the operation of piercing the animal's ear to install a new tag.

The present invention was conceived and developed with this and other needs for an improved tag in view, and the invention comprises, in essence, a two-component ear tag having a connector which may be permanently connected to the ear of a sheep and a tag body which may be easily attached to the connector to hang therefrom at a desirable position, below the animal's ear, and which may be relatively easily removed from the connector when it is desired to do so.

Another object of the invention is to provide a novel and improved two-component ear tag, including a connector which is especially easy to attach to the ear of an animal in a quick, simple, painless operation without the need of any special tools.

Another object of the invention is to provide a novel and improved two-component ear tag, including a connector adapted to be attached to an animal's ear and which will receive and hold a tag body below the animal's ear in a normally, transversely oriented position where it may be easily observed from the front or the rear of the animal.

Another object of the invention is to provide a novel and improved two-component ear tag, including a connector which may be permanently attached to an animal's ear and a tag body which may be easily attached to or disengaged from the connector, yet which is held on the connector in a positive, secure manner, so that the chance of an accidental disengagement from the connector is, as by the animal's movements, remote.

Another object of the invention is to provide a novel and improved two-component ear tag which is formed of selected resilient, tough and pliable materials capable of withstanding the effects of weathering and abuse, with the tag being in a form which will not easily become tangled with brush or the like, when being worn by the animal.

Another object of the invention is to provide a novel and improved two-component ear tag wherein both components may be formed of materials capable of being manufactured of various selected, brilliant, permanent and easily observed colors, and which is especially suitable for using as a two-component color coding system for specifying information about the member of a flock of sheep or the like, in addition to supplementing numbering and/or lettering information commonly available on individual tags.

A further object of this invention is to provide a modified form of connector, particularly adapted for connecting an identification tag to a brisket or similar portion of an animal, but which will otherwise have the attributes of the ear tag of this invention.

Further objects of the invention include the provision of a two-component tag for animals, which is a reliable, simple, low cost, easily used, rugged and durable construction.

With the foregoing and other objects in view, all of which more fully hereinafter appear, my invention comprises certain constructions, combinations and arrangements of parts and elements as hereinafter described and illustrated in preferred embodiments in the accompanying drawings, in which:

FIG. 1 is a side perspective view of a sheep having a two-component tag of this invention installed in one ear thereof;

FIG. 2 is a fragmentary sectional view of the animal's ear and an edge elevation of the two-component tag, as taken substantially from the indicated line 2—2 of FIG. 1, but on a greatly enlarged scale;

FIG. 3 is a front elevation of the tag body component per se;

FIG. 4 is a front elevation of the connector component per se;

FIG. 5 is a sectional, developed side elevation of one side of the connector component per se, as taken from the inside along line 5—5 of FIG. 2;

FIG. 6 is an enlarged, fragmentary side elevation of a lower portion of the connector component;

FIG. 7 is a sectional detail view, taken from the indicated line 7—7 of FIG. 6;

FIG. 8 is an enlarged elevation, taken from the inside, of the portion of the lower part of the connector portion shown in FIG. 6;

FIG. 9 is a bottom plan view of the connector portion shown in FIG. 6;

FIG. 10 is an edge elevation of a connector component per se, similar to FIG. 2, but illustrating a modified construction having a slitting spur affixed thereto to facilitate the insertion of the connector through the ear of an animal;

FIG. 11 is a sectional, developed side elevation of one side of the modified connector component, taken from the indicated line 11—11 of FIG. 10;

FIGS. 12 and 13 are transverse sections, taken from the indicated lines 12—12 and 13—13, respectively, of FIG. 11, but on an enlarged scale;

FIG. 14 is an edge elevation of the modified connector component; and

FIG. 15 is a side elevation of another modified connector component.

Referring more particularly to the drawings, the two-component ear tag constructed according to the invention includes, as one component, an elongated, staple shaped connector C, which is adapted to be mounted in a slit 9 of FIG. 2, in the ear E of an animal, such as the sheep illustrated at FIG. 1. The other component is a flat, pliable tag body T which is adapted to be attached to and depend from the connector C. Although this two-component tag is illustrated as being used on a sheep, it is to be understood that it may be used for other animals, such as cattle, goats, pigs and the like, and may even be used for wild life identification purposes, as on deer, elk and other wild animals. The slit 9 is made in the animal's ear E in the fleshy, lower portion of the ear and as close to the head as possible, as by a small knife blade, and the connector C is threaded therein. The tag body T may be attached to the connector C either before or after it is mounted in the animal's ear, all as will be hereinafter further described, although if the tag is attached to the connector prior to attachment of the connector to the ear, a final locking step is normally involved.

The staple shaped connector C, as in FIGS. 2 and 6, includes an insertion arm 10 and a holding arm 11 which are generally flat, straight members lying in spaced parallelism, as about one-half inch apart, to embrace the ear tissue with a light grip. These arms 10 and 11 are interconnected at their upper ends by a crotch 12, which is generally circular in cross section to minimize chafing the tissue in the ear of the animal wherein the connector is mounted. Thus, the arms 10 and 11 change from a flat, rectangular section to a rounded section as they turn into the crotch.

The opposing, lower end of the insertion arm 10 converges and turns towards and partly around the holding arm 11 as an inclined, converging finger 13 and an angularly disposed wedge 14 having a blunt point, with a reduced section 15 between. This finger serves two purposes, first the blunt pointed end of wedge 14 facilitates its insertion into slit 9 in the ear of an animal. Secondly, it extends below and lies closely to the lower end of the holding arm 11 to facilitate keeping the tag body T in place, as will be hereinafter described.

The opposing lower end of the holding arm 11 is narrowed, as in FIG. 4, and rounded in section, being curved in a loop about itself to form a circular hook 17 which is oriented in a plane transversely to the flat surface of the arm 11. The opening between the top of the hook and arm 11 is comparatively narrow, being almost closed by a rounded dimple 18 at the end of the hook loop, as in FIG. 6. This narrow space between the dimple 18 and the arm 11 assists in preventing the tag body T from being easily disconnected in an accidental manner.

To further assist in preventing accidental disconnection of a tag from the hook, a generally triangular knob 19 outstands from the inside of the arm 11, at a spacing from the top of the hook sufficient to permit a tag to be inserted in the opening only by partially folding the tag around the knob 19. To eliminate such folding by accidental movements after the tag is in place on the hook, the under surface of the knob 19, adjacent to the dimple 18, is preferably normal to the surface of the arm 11, as in FIGS. 6 and 7.

An additional positive lock is formed on the hook, adapted to permit the tag to be attached to the hook, but to prevent its being released once fully and properly attached. In preferred construction, a pair of opposing lateral bulges 20, as in FIGS. 4 and 8, are located on the curved shank of the hook adjacent arm 10, with the lower end 21 of each bulge 20, as in FIG. 6, being vertical and flat, to prevent the tag body T from slipping upwardly from the lower portion of hook 17. In addition, a wedge 22 extends downwardly from hook 17 and has a flat end 23 below but slightly inwardly from flat ends 21 of bulges 20. When a tag of resilient material is used, having a connective hole slightly greater than the diameter of hook 17, the hole will be first stretched over the bulges 20 and wedge 22, then snap back to its original diameter once it is threaded on the hook. The bulges 20 and wedge 22 will thus lock it in position.

Connector C is preferably made of a substantially rigid but resilient material of a type which is non-irritating to an animal's flesh, so that when it is inserted into slit 9 in an animal's ear, healing of the slit about the crotch will be rapid, especially when used with an antiseptic to prevent infection. It is contemplated that the connector arms will be approximately one-half inch wide and an inch and one-half long, but such dimensions and the mentioned one-half inch spacing between these arms may be varied as desired, especially when the unit is used for animals other than sheep. An ideal material for the manufacture of connector C is nylon, which may be formed to shape by an injection molding process as a tough, strong, elastic, weather-resistant and non-irritating member. Moreover, nylon may be molded in any one of a number of brilliant colors for color coding purposes, as hereinafter explained.

The tag body T is formed as a flat, resilient member, more pliable than the material of connector C, to include a panel 25 which is pendulated from an upstanding neck 26. A larger hole 27 is located at the top of the neck, hole 27 corresponding in diameter to hook 17, so that it may be threaded and stretched upon the hook 17 of the connector C, as in the manner described above, to reach the position illustrated in FIG. 2. Below hole 27 is a smaller hole 28, corresponding in diameter to reduced section 15 and adapted to be pushed over wedge 14 and onto reduced section 15, to the position of FIG. 2, after hole 27 has been threaded onto hook 17, so that lateral movement of neck 27 will be impeded and an encounter with brush, a tree limb, a fence post or other obstruction, particularly one against which the animal may rub, will not twist the tag and catch it to thread the tag off the hook.

Tag T is preferably symmetrical about a vertical axis centered through the upstanding neck 26 and the panel 25 pendulated therefrom and may be of any suitable form, such as a rectangle, a circle or the generally six-sided member, such as that illustrated. This six-sided panel member includes a pair of sloping, generally arcuate shoulders 29, each shoulder outstanding from a side of the neck and fairing into the neck, with the outer corner of each shoulder being rounded to turn downwardly to fair into a vertical side edge of panel 25. The sloping, arcuate filleted and rounded shoulders 29 thus provide a smooth tapering panel which may be easily pulled away from brush and from any similar obstruction which the animal may encounter, as when it is grazing. The lower corner of each side edge of the panel is suitably rounded and turned into an inclined bottom edge 30 which converges towards the center of the panel to connect with an opposing bottom edge 30 at a rounded bottom point 31. Panel 25 may be divided into an upper face area and a lower face area by a narrow ridge 32 extending across each side of the face in an arcuate manner which approximately parallels the slope of the shoulders 29. Ridge 32 facilitates placing the tag panel in a stencil wheel or other printing device for transferring numbers and markings onto the face of the tag, and different types of indicia may be placed on panel 25, above and below ridge 32, the same indicia normally being placed on both sides of the tag.

Tag body T is preferably made of a pliable, tough, weather-resistant material which can be furnished in selected various colors and which will easily take clearly contrasting printing or markings in a color distinguished from the background color of the tag. It has been found that an ideal material for this purpose is a synthetic resin commonly known as polyurethane, for this material is tough and rubber-like, and will also resist the effects of sunlight and other weather conditions to which it will be exposed when worn as an ear tag. When the tag is made of polyurethane, it may be formed by injection molding or more simply, tags may be cut from sheet stock at a comparable low unit cost. Also, polyurethane tags may be furnished in a number of distinctive colors.

To connect this two-component tag to a sheep or any other animal, a normal first step is to attach hole 27 of the tag body to the connector C. Next, the slit 9 is to cut at the selected location in the tough, cartilage-like lower portion of the animal's ear, as with an ordinary pen knife. The connector is then threaded into slit 9 by spreading the arms 10 and 11 apart for clearance for the ear tissue and at the same time, inserting the wedge 14 into the ear slit. Next, the insertion arm 10 is pulled through the slit 9 until the crotch 12 is in the slit and the connector C depends from the ear. Then, hole 28 is threaded onto wedge 14 to reach reduced section 15, with the tag then being in the position of FIG. 2. The sequence can be varied by attaching the tag body T to the connector after the connector is mounted in the animal's ear. As will be evident, the ends 21 of bulges 20 and end 23 of wedge 22, together with wedge 14, cooperate in making accidental removal of the tag practically impossible. Nevertheless, the tag body T may be deliberately removed from the connector C quickly and easily, as where it is necessary, for example, to change tags.

After tagging, the animal is released until such time as it become desirable to change or remove the tag body T. The tag body T is disengaged from the connector by grasping arm 10 with one hand and neck 26 of the tag body with the other, to pull wedge 14 back through hole 28, then lifting and twisting the tag and pulling arm 10 away, then pulling the end of the neck 26 past wedge 22 and bulges 20 and off the hook 17. Subsequently, another tag may be placed in the connector hook. Also, it is contemplated that more than one tag body T can be carried on a single connector hook 17.

Not only is the method of connecting and disconnecting tags a quick and simple procedure, but also an advantageous color coding combination is possible. For example, the connector C may be of several colors, such as red and blue, and the tag bodies may be of like or different colors, such as green and orange. Such colors can be easily spotted on the animals in a flock even at distances where the individual numbers on the tags cannot be read. Color coding may be a simple matter, for example, the red or blue colors can be used on the connector to specify a characteristic of the animal which will not be changed, for example, its sex. The colors on the tag bodies T can be used to specify other characteristics which may be changed from time to time, for example, the animal may first be retained in the flock for breeding purposes or for wool producing purposes, but later, as at the end of a season, to be sold.

The connector C' illustrated in FIGS. 10 through 14, is substantially the same as the connector C heretofore described, but includes an ear piercing spur S as an extension of the wedge 14' of the insertion arm 10. In use, it is contemplated that this piercing spur S will cut through the ear tissue of a sheep to form split 9 of FIG. 2, as part of the same operation of threading the arm 10 into the slit 9. This eliminates the separate, ear splitting operation with a knife which is otherwise necessary before a connector C, as heretofore described, can be attached to the ear. It is further contemplated that the piercing spur S will be broken off from the connector C' after it is threaded upon the sheep's ear, as in the manner hereinafter described. Then, a tag body may be attached to the connector, as hereinbefore described.

The spur S is formed as a generally flat, triangular body in the general shape of an arrowhead, having a rear base 35 which is flat on the outside, as in FIGS. 12 and 13, and obtuse on the inside, opposite hook 17. As in FIGS. 13 and 14, a pyramidal projection is disposed on the outside, to provide a short but sharp outer cutting edge 37 which extends from a leading point 38. An inside cutting edge 39 diverges sharply from outside cutting edge 37, so that edges 37 and 39 initially pierce the ear, but then angle less sharply, so that lateral cutting edges 40, which diverge less rapidly, enlarge the slit following the passage of pyramid 36. The width of the rear end of the base 35 is somewhat greater than the width of the insertion arm 10, so that the insertion arm will fit into an ear slit formed by the spur.

Spur S is attached to the end of wedge 14' by a short neck 41, as an extension of wedge 14', with the leading point 38 being centered with respect to the longitudinal axis of the wedge. It is contemplated that this modified connector C' will otherwise be a unitary member formed by injection molding of nylon or a like material and with a proper mold, the point 38 and cutting edges 37, 39 and 40 being molded with sufficient sharpness as to easily cut into ear tissue. With such material, the spur S may also be easily broken off at the reduced section at the outer end of wedge 14', adjacent neck 41, after the connector has been inserted into the ear of the animal.

The brisket connector B of FIG. 15 is particularly adapted to be installed in a brisket or similar portion of an animal, which is considerably thicker than an ear but in which identification tags are often placed on beef cattle. The connector B is provided with a ring 45, which corresponds to crotch 12, the ends of ring 45 being spaced apart and respectively connected to an arm 46, convexly curved on the outside, and an arm 47, concavely curved on the outside. Arm 46 corresponds to arm 10 and arm 47 to arm 11 of the previous embodiments. Ring 46 is circular in cross section, while arms 46 and 47 may be generally rectangular in cross section. Arm 46 carries a finger 13 connected to a wedge 14 by a reduced section 15, while arm 47 carries a hook 17' having a dimple 18 at the end, bulges 20 and a bottom wedge 22. As will be evident, a tag body similar to that shown in FIG. 3 may be used with the connector B in a manner similar to that described in connection with connector C. Also, connector B may, if desired, be provided with a breakable spur, similar to spur S of connector C'.

While I have now described my invention in considerable detail, it is obvious that others skilled in the art can build and devise alternate and equivalent constructions which are nevertheless within the spirit and scope of my invention.

What is claimed is:

1. A two-component tag for livestock, including a connector adapted to be attached to an ear or the like of an animal and a tag body adapted to be attached to the connector to depend therefrom, wherein said connector comprises:

a pair of arms connected at one end by a connecting section;

one of said arms being adapted to be threaded from its opposite end through a slit in an animal's ear or the like to place the connecting section in the slit and permit the arms to extend and depend therefrom at each side of the ear;

the other of said arms including a hook at its opposite end adapted to hold the tag body, said tag body having a hole therein adapted to engage said hook; and said one arm extending around in spaced relation to said hook and in the opposite direction to said hook; and said tag body being provided with an additional hole for engaging said one arm, simultaneously with engagement of said first hole with said hook.

2. A tag as defined in claim 1, wherein:

said hook is provided with means for restraining movement of said tag body off said hook; and said other arm is provided with means for restraining movement of said tag body off the same.

3. A tag as defined in claim 2, wherein said restraining means of said hook and said other arm are on opposite sides of said tag body when installed thereon.

4. A two-component tag for livestock, including a connector adapted to be attached to the ear or the like of an animal by threading the same in a slit in the said ear or the like and to hang therefrom, and a tag body adapted to be attached to the connector to depend therefrom below the slit, wherein:

said connector comprises a staple-shaped member having a pair of flat, essentially straight arms, a crotch of generally circular cross section at one end of the arms and holding them apart in spaced parallelism, one of the arms functioning as an insertion arm and including an end wedge and a converging finger at the end opposite to the crotch, said insertion arm being adapted to be threaded through said slit to permit the crotch to be positioned in said slit with the arms being extended along each side of the ear and the other of said arms functioning as a holding arm and including a circle hook at the end opposite to the crotch; and said tag body comprises a panel with a neck upstanding from the panel and having a first hole adjacent its upper end adapted to engage said hook by threading said hook through said first hole and a second hole below said first hole adapted to engage said first arm by threading said wedge through said second hole.

5. A tag as defined in claim 4, wherein said hook is provided with a bulge on each side adapted to hold said tag on said hook once said tag is threaded upon said hook.

6. A tag as defined in claim 5, wherein said hook turns about its arm to substantially a full turn with a comparatively narrow opening between the end of said hook and the arm surface, and a knob outstanding from the surface of said arm closely adjacent to the opening and adapted to require the tag to be folded adjacent to the connection hole and to restrain accidental disengagement of said tag from said hook.

7. A connector for connecting an identification tag to the ear or the like of an animal, comprising:

a pair of spaced, generally parallel arms connected together at one end by a crotch having a rounded outer surface, said arms being generally flat and having a width greater than the width of the central portion of said crotch;

the opposite end of one arm being adapted to be placed in an opening in said ear or the like and said one arm moved therethrough until said crotch occupies said opening; and the opposite end of the other arm having means for attaching said tag thereto, whereby said arms depend from said crotch on opposite sides of said ear or the like and said tag depends from said connector.

8. A connector as defined in claim 7, wherein:

said means for attaching said tag to said other arm includes an arcuate hook forming an opening at the inside of said other arm; and said one arm adjacent said hook is inclined toward said hook and then extends in spaced relation to at least a portion of the outside of said hook.

9. A two-component tag for livestock, including a connector adapted to be attached to an ear or the like of an animal and a tag body adapted to be attached to the connector to depend therefrom, wherein said connector comprises:

a pair of arms each having a flat, straight portion and held apart in spaced, substantially parallel relation by a crotch having a rounded cross section;

one of said arms being adapted to be threaded from its opposite end through a slit in an animal's ear or the like to place the connecting section in the slit and permit the arms to extend and depend therefrom at each side of the ear;

the other of said arms including a hook at its opposite end adapted to hold the tag body, said tag body having a hole therein adapted to engage said hook;

said one arm being formed with a finger at the end opposite to the crotch which is turned towards the hook of the other said arm to lie closely adjacent thereto; and said hook being turned towards said one arm and the opening between the free end of said hook and the connected arm is positioned between the arms, whereby said finger facilitates holding the tag body upon the hook against accidental disengagement.

10. A tag as defined in claim 9, wherein said hook is formed as a loop at the end of the arm which extends substantially about a full circle with a narrow gap at the end thereof of sufficient width to receive the neck portion of the tag body when it is being engaged upon the hook, but being sufficiently narrow to prevent the tag body from being accidentally disengaged from the hook.

11. A two-component tag for livestock, including a connector adapted to be attached to an ear or the like of an animal and a tag body adapted to be attached to the connector to depend therefrom, wherein said connector comprises:

a pair of arms connected at one end by a connecting section;

one of said arms being adapted to be threaded from its opposite end through a slit in an animal's ear or the like to place the connecting section in the slit and permit the arms to extend and depend therefrom at each side of the ear said one arm being formed with a spur having a sharpened end adapted to cut a slit in an animal's ear or the like as the connector is being mounted upon said ear or the like, including a necked connection between said spur and the remainder of said arm adapted to permit the spur to be broken away from the connector after the connector is mounted in said ear or the like; and the other of said arms including a hook at its opposite end adapted to hold the tag body, said tag body having a hole therein adapted to engage said hook.

References Cited

UNITED STATES PATENTS 1,737,201  11/1929  Reimer _____ 40—301

FOREIGN PATENTS 533,390  9/1931  Germany.

EUGENE R. CAPOZIO, *Primary Examiner.*

W. GRIEB, *Examiner.*